US 7,405,656 B2

(12) United States Patent
Olsen

(10) Patent No.: US 7,405,656 B2
(45) Date of Patent: Jul. 29, 2008

(54) DEVICE AND METHOD FOR ENCAPSULATION AND MOUNTING OF RFID DEVICES

(75) Inventor: John Olsen, Cumming, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 145 days.

(21) Appl. No.: 10/972,827

(22) Filed: Oct. 25, 2004

(65) Prior Publication Data

US 2005/0174241 A1    Aug. 11, 2005

Related U.S. Application Data

(60) Provisional application No. 60/544,455, filed on Feb. 13, 2004, provisional application No. 60/540,508, filed on Jan. 30, 2004.

(51) Int. Cl.
| | |
|---|---|
| G08B 13/14 | (2006.01) |
| B29C 45/14 | (2006.01) |
| B29C 65/00 | (2006.01) |
| H01L 23/02 | (2006.01) |
| H01L 23/28 | (2006.01) |
| H01L 23/29 | (2006.01) |
| A61F 13/15 | (2006.01) |
| H01P 11/00 | (2006.01) |
| H01R 43/00 | (2006.01) |
| G06K 19/06 | (2006.01) |

(52) U.S. Cl. ............ 340/572.1; 340/572.7; 340/572.8; 264/272.11; 264/272.12; 264/272.13; 264/272.14; 257/678; 257/679; 257/787; 257/790; 156/60; 156/61; 156/62.2; 29/600; 29/825; 235/385; 235/492

(58) Field of Classification Search ............ 340/572.1, 340/572.8, 572.9, 572.7; 235/491, 492, 385; 257/679, 787, 678, 790; 264/272.11, 272.12, 264/272.13, 272.14; 156/60, 61, 62.2; 29/600, 29/825
See application file for complete search history.

(56) References Cited

U.S. PATENT DOCUMENTS

| | | | | |
|---|---|---|---|---|
| 5,477,219 | A * | 12/1995 | Zarembo et al. | 340/572.3 |
| 5,528,222 | A * | 6/1996 | Moskowitz et al. | 340/527.7 |
| 5,682,143 | A * | 10/1997 | Brady et al. | 340/572.7 |
| 5,988,510 | A * | 11/1999 | Tuttle et al. | 235/492 |
| 6,100,804 | A * | 8/2000 | Brady et al. | 340/572.7 |
| 6,265,977 | B1 * | 7/2001 | Vega et al. | 340/572.7 |
| 6,369,711 | B1 * | 4/2002 | Adams et al. | 340/572.1 |
| 6,421,013 | B1 * | 7/2002 | Chung | 343/700 MS |
| 6,518,885 | B1 * | 2/2003 | Brady et al. | 340/572.7 |
| 6,569,508 | B2 * | 5/2003 | Babb et al. | 428/40.1 |
| 6,592,043 | B1 | 7/2003 | Britton | |
| 6,666,379 | B2 * | 12/2003 | Lake | 235/491 |
| 6,758,000 | B2 * | 7/2004 | Sandt et al. | 40/300 |
| 6,951,596 | B2 * | 10/2005 | Green et al. | 156/264 |
| 7,106,201 | B2 * | 9/2006 | Tuttle | 340/572.7 |
| 7,221,257 | B1 * | 5/2007 | Tuttle | 340/10.1 |
| D555,468 | S | 11/2007 | Caswell et al. | |
| 2003/0034087 | A1 | 2/2003 | Latschbacher | |
| 2005/0075105 | A1 | 4/2005 | Smith et al. | |

FOREIGN PATENT DOCUMENTS

| | | |
|---|---|---|
| DE | 100 56 473 C 1 | 1/2002 |
| DE | 101 13 921 A 1 | 9/2002 |
| EP | 0 749 094 A2 | 12/1996 |
| EP | 0 772 152 A2 | 5/1997 |
| EP | 1 246 152 A1 | 10/2002 |
| WO | WO 96/08596 | 3/1996 |

OTHER PUBLICATIONS

International Search Report from International Application No. PCT/US2004/043919 dated Dec. 12, 2004.
International Searching Authority; International Search Report; mailed May 11, 2005; regarding International Application No. PCT/US2004/286320, "Device and Method for Encapsulation of Mounting of RFID Devices" (European Patent Office); 5 pages.

DomeLabels.com—What are Domes; http://www.domelabels.com/domedlabels.htm; Dated 2003; Accessed Jan. 2004; Benchmark Technologies, Inc. Applicant makes no admission that this reference constitutes prior art.

Raymond Page; RF Design Awards—A Low Power RFID Transponder. Applicant makes no admission that this reference constitutes prior art.

Copytag- Five Straightforward Steps; http://www.copytag.com/; Accessed Jan. 2004; pp. 1 of 3. Applicant makes no admission that this reference constitutes prior art.

Alien Technology—Bringing RFID Down to Earth; World's first "Hybrid Scanner" Opens Door For Stores to Read High Tech Tags at Checkout; http://www.alientechnology.com/index.php?option=news&task=viewarticle&sid=8; Dated Sep. 23, 2002; Accessed 2004; pp. 1 - 3. Applicant makes no admission that this reference constitutes prior art.

Alien Technology—Bringing RFID Down to Earth; RFID Products; http://www.alientechnology.com/index.php?option=displaypage&Itemid=56&op=page&SubMenu=; Dated 2004; Accessed 2004; p. 1 of 1. Applicant makes no admission that this reference constitutes prior art.

Alien Technology—Bringing RFID Down to Earth; 2450 MHz System; http://www.alientechnology.com/index.php?option=displaypage&Itemid=61&op=page&SubMenu=; pp. 1 of 2; Dated 2004; Accessed 2004. Applicant makes no admission that this reference constitutes prior art.

Alien—915 MHz RFID Tag; Dated 2002. Applicant makes no admission that this reference constitutes prior art.

Alien—2450MHz Long Range Backscatter System; Dated 2002. Applicant makes no admission that this reference constitutes prior art.

Alien Technology—Bringing RFID Down to Earth; What Does "Class 1" refer to? Why did the Center start there?; http://www.alientechnology.com/index.php?option=faq&task=viewfax&artid=7; p. 1 of 1; Dated 2004; Accessed Jan. 2004. Applicant makes no admission that this reference constitutes prior art.

Transponder News—How RFID systems work: A brief introduction to some of the systems available; http://rapidttp.com/transponder/newswork.html; p. 1 of 2; Accessed Jan. 2004. Applicant makes no admission that this reference constitutes prior art.

Transponder News—How it works (Part 2); http://rapidttp.com/transponder/newswrk1.html; p. 1 of 2; Accessed Jan. 2005. Applicant makes no admission that this reference constitutes prior art.

Transponder News—What are Transponders; http://rapidttp.com/transponder/rfidbasi.html; p. 1 of 2; Accessed Jan. 2005. Applicant makes no admission that this reference constitutes prior art.

RFiD Journal: Opinion—EPC and ISO 18000-6; http://www.rfidjournal.com/article/articleview/325/1/2/; p. 1 of 3; Accessed Jan. 2004. Applicant makes no admission that this reference constitutes prior art.

RFID stuff.com Powered by Frontweb; http://www.rfidstuff.com/default.asp; Accessed Jan. 2005; p. 1 of 2. Applicant makes no admission that this reference constitutes prior art.

\* cited by examiner

*Primary Examiner*—George A Bugg
*Assistant Examiner*—Lam P Pham
(74) *Attorney, Agent, or Firm*—Alston & Bird LLP

(57) ABSTRACT

This invention involves encapsulating an RFID device in an encapsulating material by known encapsulating processes to form a domed, encapsulated RFID tag. The encapsulating material may be translucent or opaque, flexible or hard, and has minimal effect on transmission or reception of radio frequency (RF) signals. The invention further involves a stand-off bracket, composed of one or more materials that have minimal effect on transmission or reception of RF signals, for mounting an RFID device on or near materials that impede RF transmission and reception. The encapsulated RFID tag and stand-off bracket, separately, may have an adhesive or other attachment means on one of their surfaces so that they may be adhered or otherwise attached to another surface. In one application, an encapsulated RFID tag in the 860-928 MHz range is mounted on a stand-off bracket and may be used for tracking items to which it is attached.

25 Claims, 16 Drawing Sheets

DEVICE AND METHOD FOR ENCAPSULATION AND MOUNTING OF RFID DEVICES

CROSS-REFERENCE TO RELATED APPLICATIONS

This application claims the benefit of U.S. Provisional Application Nos. 60/540,508, filed Jan. 30, 2004, and 60/544,455, filed Feb. 13, 2004.

BACKGROUND OF THE INVENTION

1. Field of the Invention

The present invention relates generally to radio frequency identification (RFID) devices and, more particularly, to the encapsulation and mounting of RFID devices. Specifically, the present invention relates to the domed encapsulation of RFID transponders and their mounting on surfaces that impede radio frequency (RF) transmissions.

2. Description of Related Art

Radio frequency identification (RFID) is an information acquisition technology. RFID systems are generally designed to manage assets of many types. RFID systems are generally comprised of transponders (a/k/a "tags"), a transmitter to provide energy to the tags, a receiver to receive transmissions from the transponders, and a computer system to process the received information. The transmitter and receiver may be combined into a single device often referred to as an interrogator or reader. Typically a small RFID tag is attached to the asset so that either the asset's presence at a certain location can be detected or the asset can be identified by the response of the tag to the interrogation either by hand-held interrogators or fixed-site interrogators that are encountered in the course of asset movement. The failure to detect an expected RFID signal may also be used as an indicator.

RFID transponders may be exposed to a variety of harsh environments during the course of their use. For this reason, tags must be tolerant of many hostile chemicals, abrasives, weather conditions and mechanical stresses. Although RFID devices generally are packaged in a plastic housing, these housings may lack sufficient properties to withstand harsh environments for prolonged periods.

Encapsulation of art images and advertising materials is a well-known process in the formation of domed labels. A process known as "domed encapsulation" provides an encapsulating material over a substrate on which artwork or advertising is placed. Generally, the encapsulating material is translucent, though in some instances it may be colored, tinted, or otherwise opaque. The encapsulating material makes the underlying art or advertisement stand out with a three-dimensional "wet" look and protects the artwork. Generally, the encapsulating material is comprised of an epoxy for an application where flexibility is not a requirement, or polyurethane where more flexibility is needed. Generally, the doming process depends on surface tension to form a bubble of the encapsulating material on an item being decorated without going off the edge of the item. The encapsulating material is applied to the substrate and, if required, then exposed to a hardening or curing process, such as exposure to ultra-violet light or heat. Known uses of the encapsulating process are the creation of identification, advertising and artwork used on automobiles, computers and computer cases, name badges and lapel pins.

RFID devices are commonly used on or near a number of surface materials. Some of these surfaces that are comprised of materials such as, for example, various metals, impede or block the transmission and reception of radio frequency (RF) signals by the RFID devices. In other instances, materials proximate to the surface on which the RFID device is mounted may impede the transmission and reception of RF signals by the RFID device. An example would be a glass or plastic container holding a fluid that interferes with the transmission and reception of RF signals by an RFID device mounted on or within the container.

Therefore, a method and apparatus are needed to overcome challenges associated with the use of RFID devices, some of which are given above, including protecting RFID devices through encapsulation, overlaying the devices with images, and mounting the devices so that their reception and transmission of RF signals is not impeded.

BRIEF SUMMARY OF THE INVENTION

The present invention overcomes many of the challenges encountered in the art by combining RFID technology with the process of encapsulation, and by the use of a spacing or stand-off device for mounting an RFID device. According to one embodiment of the invention, an RFID device such as, for example, an RFID transponder, is encapsulated by known domed encapsulation techniques to conceal the RFID device and form a protected RFID device for use in harsh environments. Furthermore, the embodiments of this invention provide a domed encapsulated RFID apparatus and method of forming the same, such that interference, attenuation and absorption of the radio frequency (RF) signal by the encapsulating material and by any surface on which the encapsulated RFID device is placed is minimized.

The packaging of RFID devices performs several functions, including environmental protection and concealment. However, the packaging material should be compatible with the RF performance of the tag to avoid degradation of the performance of the RFID system. The present invention involves encapsulating a standard RFID tag in a manner that will protect or conceal the RFID tag. Because of its use in artwork and labeling, domed encapsulation is relatively inexpensive. An economical way to encapsulate an RFID device is by using a domed polyester or polyurethane process.

In one embodiment of the invention, a spacing device holds an RFID device a distance away from a mounting surface so that RF interference caused by the mounting surface or nearby materials is lessened.

In one embodiment, an art image such as a logo, trademark slogan, etc. is encapsulated with the RFID tag, while in other embodiments the RFID device may be encapsulated without any such art image. In addition, one or more surfaces of the encapsulated RFID tag may comprise an adhesive material to facilitate mounting of the encapsulated RFID tag on a body.

One aspect of the invention is an encapsulated RFID device.

Another aspect of the invention is an encapsulated RFID device having an art image.

Another aspect of the invention is an encapsulated RFID device used to track shipments.

Another aspect of the invention is an encapsulated RFID device used to track shipments by being attached to a tractor or a trailer.

Another aspect of the invention is an encapsulated RFID device such that the RFID device is concealed.

Another aspect of the invention is a concealed, encapsulated RFID device having an art image.

Another aspect of the invention is a concealed, encapsulated RFID device used for one or more of a label, nametag, luggage tag, advertisement, key fob, emblem, automobile emblem, or decoration.

Yet another aspect of this invention is an encapsulated RFID device comprised of one or more materials having certain thicknesses such that interference with RF signals is minimized.

Another aspect of the invention is a stand-off bracket configured to maintain an RFID device in the 860-928 MHz range a distance from a supporting surface.

Another aspect of the invention is a stand-off bracket for mounting an RFID device in the 860-928 MHz range on a surface or near a material that impedes or blocks RF transmission.

Another aspect of the invention is an RFID device in the 860-928 MHz range mounted on a stand-off bracket.

Another aspect of the invention is an encapsulated RFID device mounted on a stand-off bracket.

Another aspect of the invention is a domed, encapsulated RFID device mounted on a stand-off bracket.

Yet another aspect of the invention is an RFID device mounted in the mirror assembly of a vehicle.

Another aspect of the invention is an encapsulated RFID device mounted in the mirror assembly of a vehicle.

Another aspect of the invention is a domed, encapsulated RFID device mounted in the mirror assembly of a vehicle.

Yet another aspect of the invention is an RFID device mounted on a stand-off bracket within a mirror assembly of a vehicle.

Another aspect of the invention is an encapsulated RFID device mounted on a stand-off bracket within a mirror assembly of a vehicle.

Another aspect of the invention is a domed, encapsulated RFID device mounted on a stand-off bracket within a mirror assembly of a vehicle.

These and other aspects of the invention not provided above are more fully described herein.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 8C is a cross-sectional view of an embodiment of a stand-off bracket for an RFID device having an exemplary encapsulated RFID device mounted thereon;

FIG. 8D is a cross-sectional view of an embodiment of a stand-off bracket for an RFID device not having an RFID device mounted thereon;

DETAILED DESCRIPTION OF THE INVENTION

The present invention now will be described more fully hereinafter with reference to the accompanying drawings, in which some, but not all, embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1A:
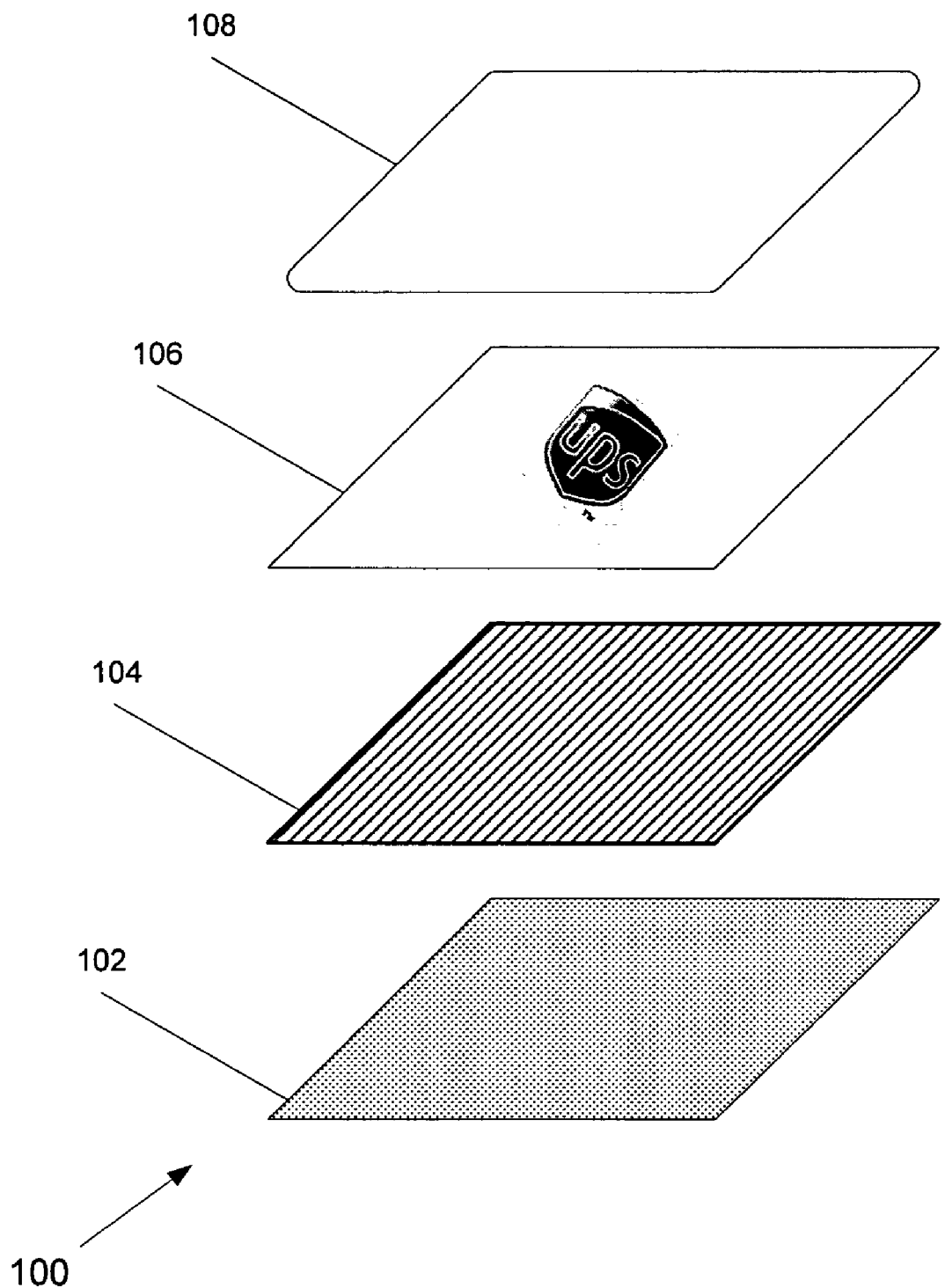
FIG. 1A is an exploded view of the components that comprise an exemplary domed encapsulated RFID tag in an embodiment of the invention.

FIG. 1A is an exploded view of the components that comprise an exemplary domed encapsulated RFID tag 100 in an embodiment of the invention. In this embodiment, an adhesive layer 102 comprised of an approximately 2 millimeter (mil) thick acrylic adhesive liner is substantially attached to and underlies an RFID device 104, though other thicknesses and types of adhesive may be used. In one embodiment, this adhesive layer 102 has an adhesive on its exposed surface such that it can be adhesively mounted to another surface and an adhesive on the surface that is substantially in contact with the RFID device 104 such that the adhesive layer 102 is adhered to the RFID device 104. In various embodiments, the adhesive layer 102 may be dimensioned such that it extends beyond each edge of the RFID device 104 when the adhesive layer is substantially adhered to the RFID device 104, the adhesive layer 102 may be of the same dimensions as the RFID device 104 to which it is substantially adhered, or the adhesive layer 102 may be of smaller dimensions than the RFID device 104 to which it is substantially adhered.

In the particular embodiment of FIG. 1, an image layer 106 comprised of an approximately 2.4-mil thick polyester image layer substantially lies over the RFID device 104, although in other embodiments the image layer 106 may lie substantially underneath the RFID device 104, be omitted altogether, or be composed of different materials and/or thicknesses. At least one surface of the image layer 106 is substantially adhered to the RFID device 104. If the image layer 106 substantially lies underneath the RFID device 104, one surface of the image layer 106 is adhered to the RFID device 104 and a second surface of the image layer 106 is substantially adhered to the adhesive layer 102. If the image layer substantially lies over the RFID device 104, one surface of the image layer is adhered to the RFID device 104 and a second surface of the image layer 106 is substantially adhered to a dome layer 108. The dome layer 108 such as, for example, a clear, flexible, polyurethane dome, is placed over the image layer 106 or, if the image layer 106 is omitted or lies substantially underneath the RFID device 104, the dome layer 108 is placed over the RFID device 104. If the adhesive layer 102 is dimensioned such that it extends beyond any dimension of the RFID device 104, then the dome layer 108 may be in contact with the adhesive layer 102, thereby encapsulating the RFID device 104. In other embodiments, the dome layer 108 may be of the same dimensions as the underlying RFID device 104, or the dome layer may have smaller dimensions than the RFID device. The RFID device 104 is substantially sealed from atmospheric exposure, protected, or concealed by the encapsulation.

Figure 1B:
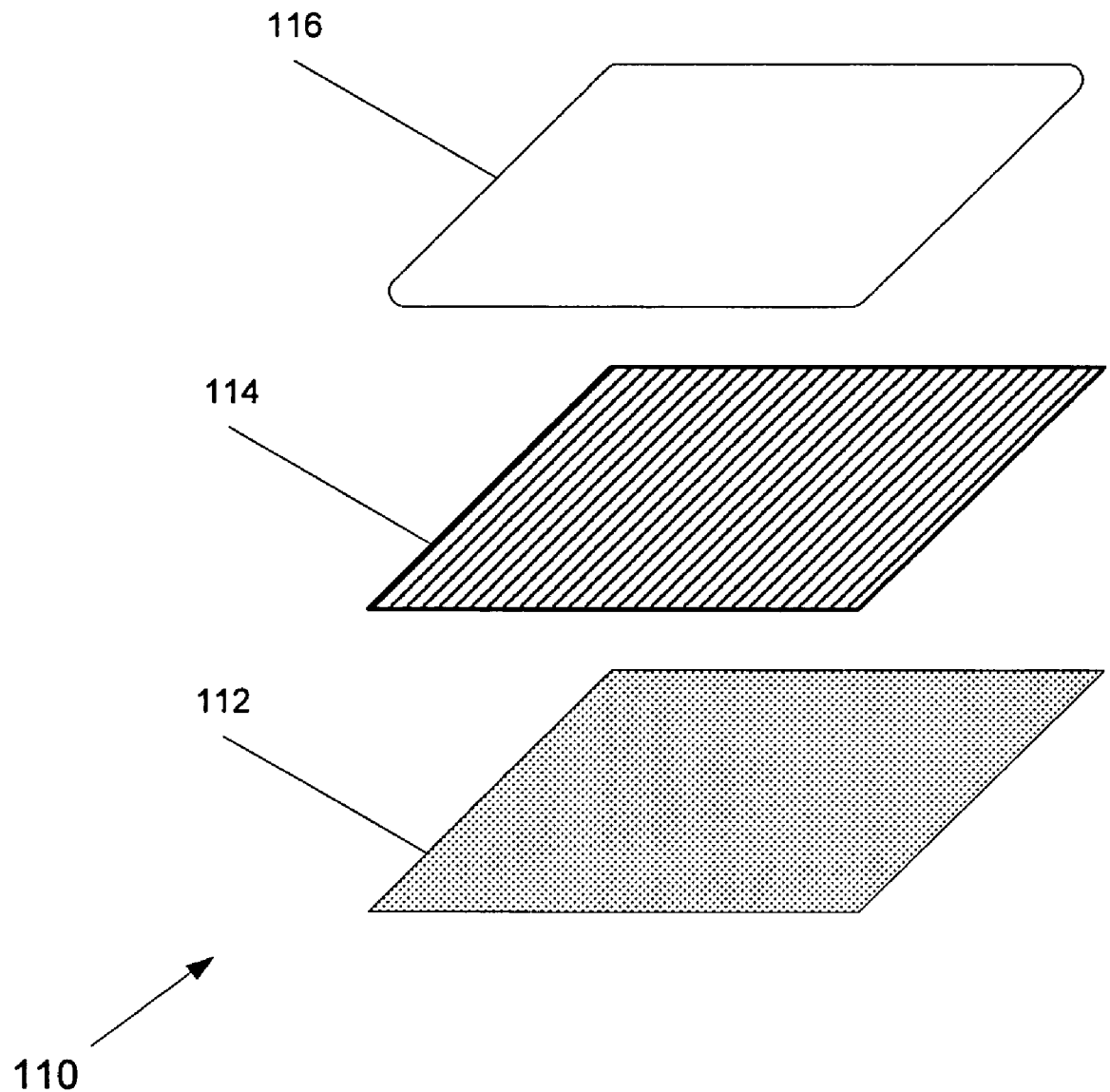
FIG. 1B is an exploded view of the components that comprise an exemplary domed encapsulated RFID tag in another embodiment of the invention.

FIG. 1B is another embodiment of the encapsulated RFID device shown in FIG. 1A. In the embodiment of FIG. 1B, the encapsulated RFID device 110 is comprised of an adhesive layer 112, an RFID device 114, and a dome layer 116. The image layer is omitted from this embodiment, as compared to the embodiment of FIG. 1A.

Figure 1C:
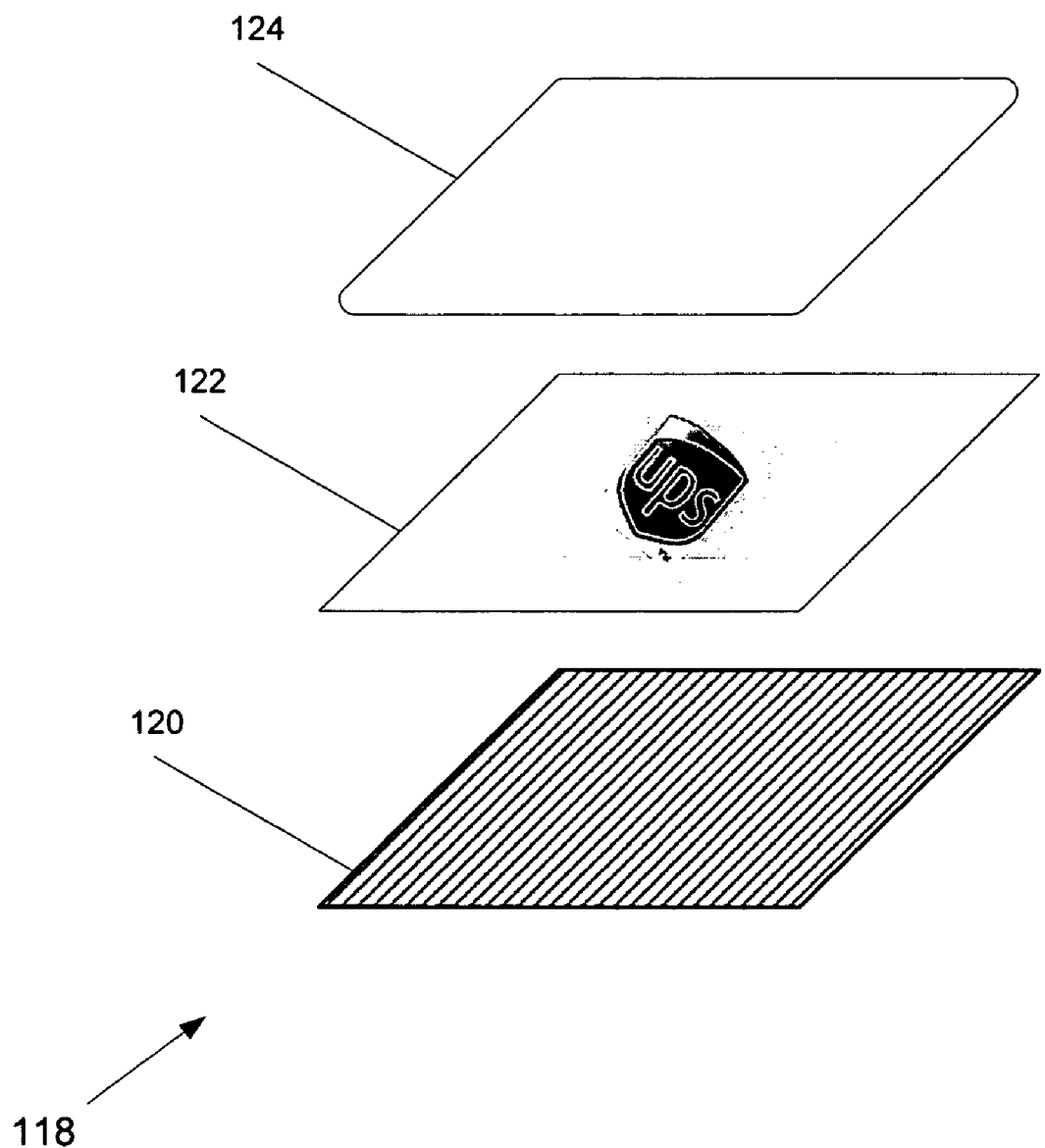
FIG. 1C is an exploded view of the components that comprise an exemplary domed encapsulated RFID tag in another embodiment of the invention.

FIG. 1C is yet another embodiment of the encapsulated RFID device shown in FIG. 1A. In the embodiment of FIG. 1C, the encapsulated RFID device 118 is comprised of an RFID device 120, an image layer 122, and a dome layer 124. The adhesive layer is omitted from this embodiment, as compared to the embodiment of FIG. 1A.

Figure 1D:
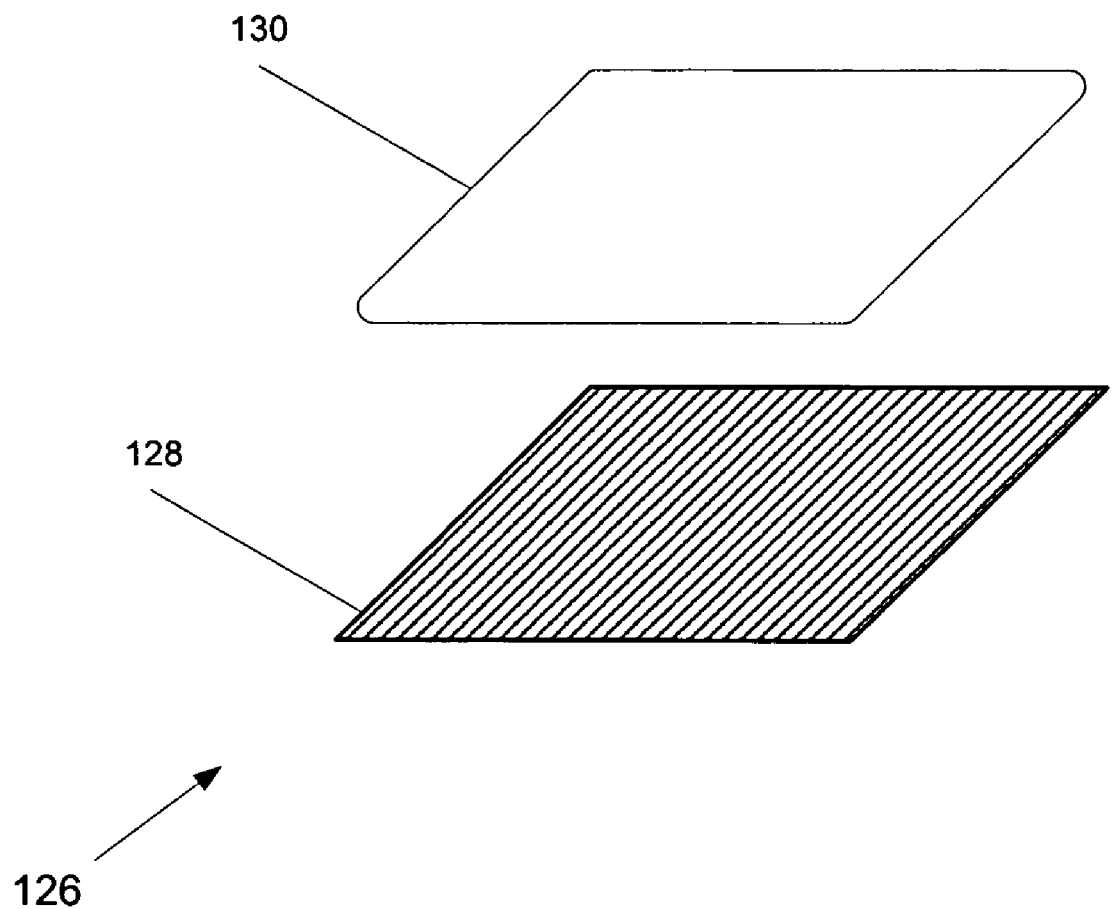
FIG. 1D is an exploded view of the components that comprise an exemplary domed encapsulated RFID tag in another embodiment of the invention.

FIG. 1D is another embodiment of the encapsulated RFID device shown in FIG. 1A. In the embodiment of FIG. 1D, the encapsulated RFID device 126 is comprised of an RFID device 128 and a dome layer 130. The adhesive layer and the image layer are each omitted from this embodiment, as compared to the embodiment of FIG. 1A.

Figure 2A:
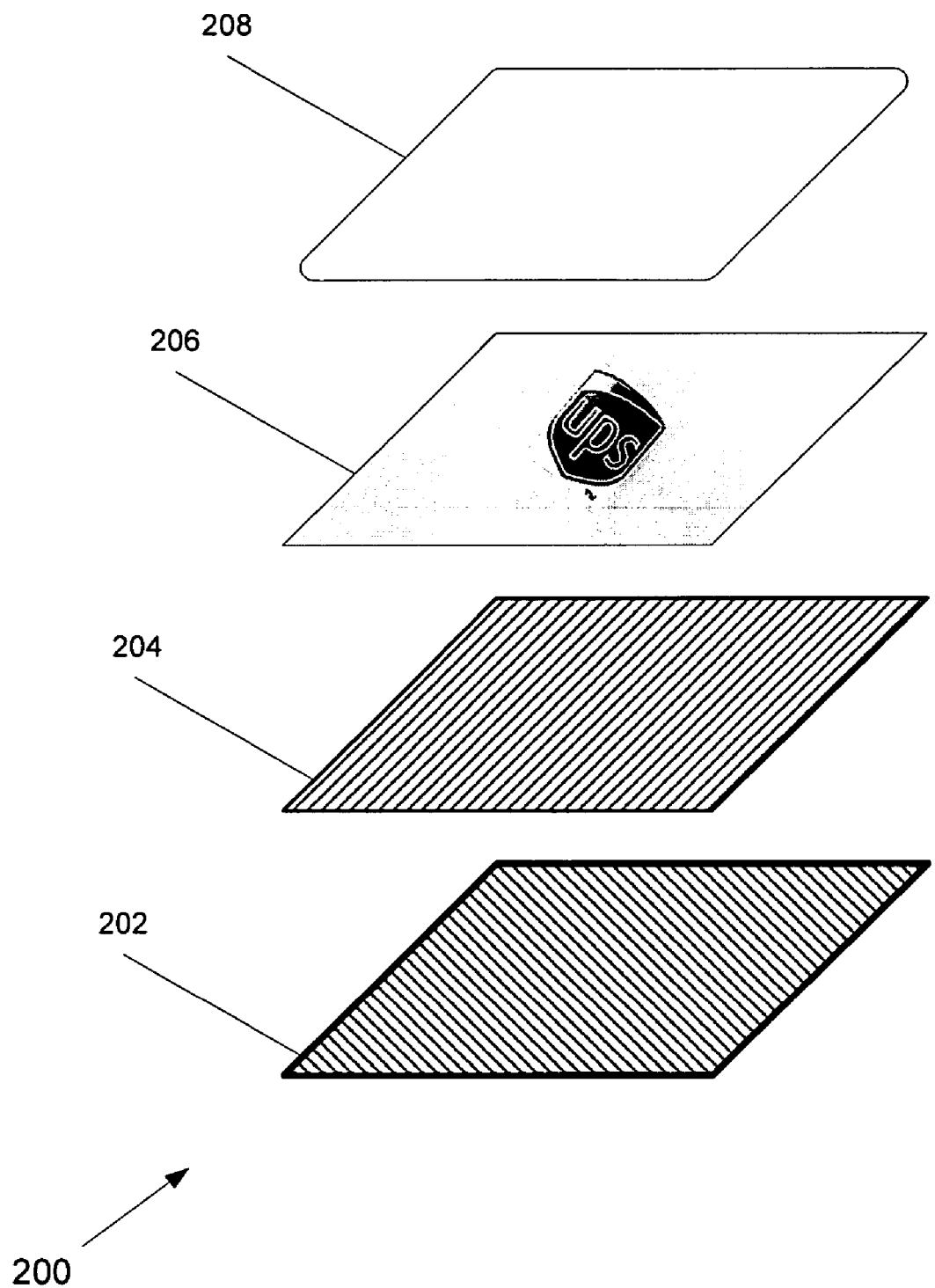
FIG. 2A is an exploded view of the components that comprise an exemplary domed encapsulated RFID tag in an embodiment of the invention having a base substrate.

In another embodiment of the invention, as shown in the exploded view of FIG. 2A, an exemplary domed, encapsulated RFID tag 200 is comprised of a substrate layer 202, an RFID device 204, an art image 206, and a dome layer 208. In this embodiment, the substrate layer 202 may be comprised of a flexible, rigid, or semi-rigid material such as, for example, plastics, ferrous or non-ferrous metals, ceramics, composites, alloys, etc. The substrate layer 202 may have an adhesive on its exposed surface to attach the encapsulated RFID tag 200 to another surface. In some embodiments, the substrate layer 202 may have attached or embedded magnets to affix the encapsulated RFID tag 200 to a surface containing magnetic material. In other embodiments, the substrate layer 202 itself may be magnetized, thus making it capable of being affixed to a surface containing magnetic material. In yet other embodiments, the substrate layer 202 may have other means of attachment to another surface such as a pin or clasp for attaching to an article of apparel, a split ring, lanyard, snap, buckle, screw, clamp, etc. An RFID device 204 is substantially affixed to the substrate layer 202. In one embodiment, the RFID device 204 is substantially adhered to the substrate layer 202; however, in other embodiments the RFID device 204 may be clamped, screwed, welded, nailed, stapled, sewn, magnetically-held, or otherwise affixed to the substrate layer 202.

The RFID device 204 is substantially encapsulated in an encapsulating material 208, thereby providing protection to the RFID device 204 and, in some instances, concealing the RFID device 204. In one embodiment, an art image 206 such as, for example, a corporation or other form of entity's logo or trademark, overlays the RFID device 204 and is substantially encapsulated in the encapsulating material 208 along with the RFID device 204.

Figure 2B:
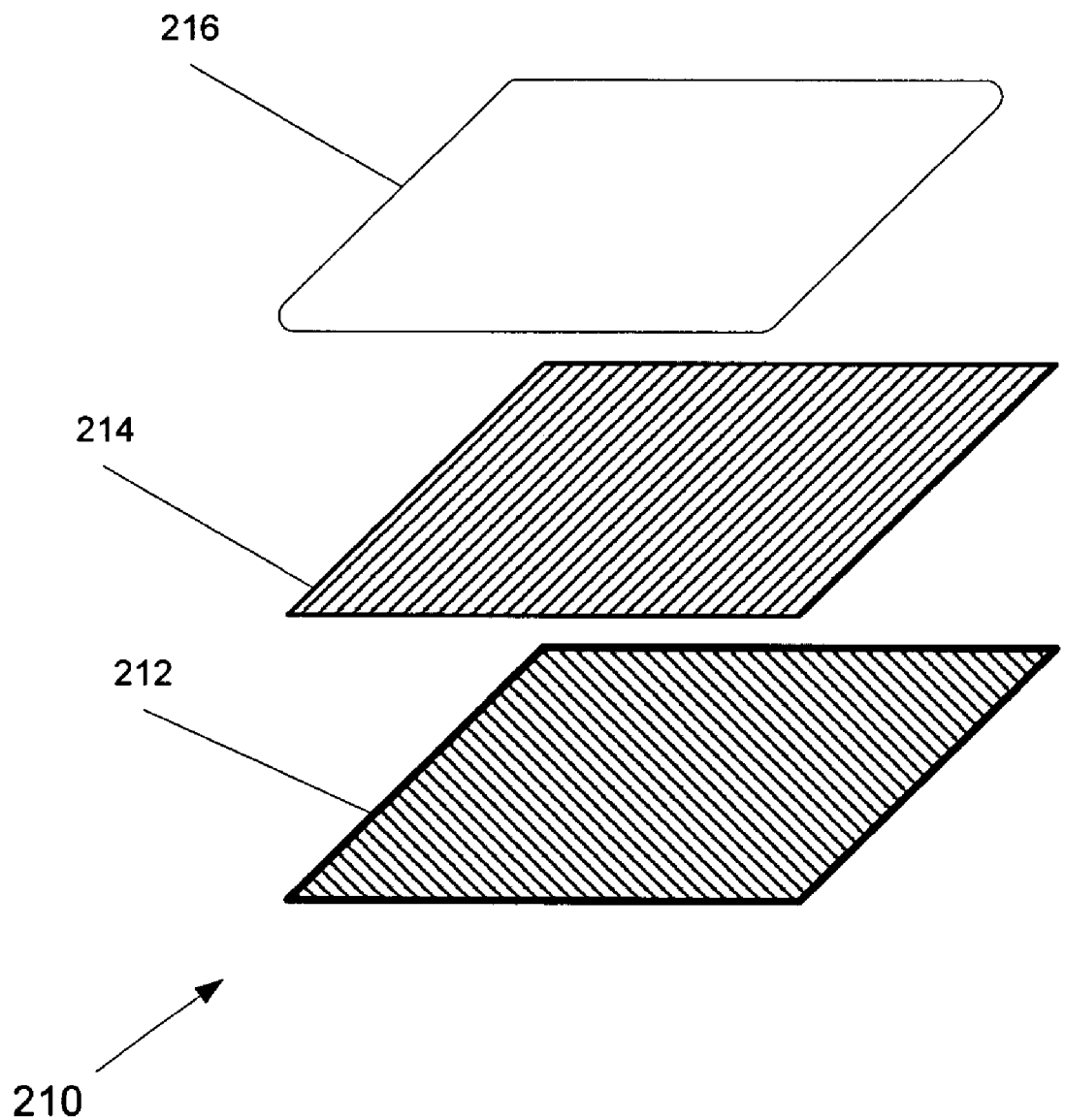
FIG. 2B is an exploded view of the components that comprise an exemplary domed encapsulated RFID tag in another embodiment of the invention having a base substrate.

FIG. 2B is an exploded view of the components that comprise an exemplary domed encapsulated RFID tag 210 in another embodiment of the invention having a base substrate 212. In this embodiment, the encapsulated RFID tag 210 is comprised of a base substrate 212, an RFID device 214, and an encapsulating material 216. As compared to the embodiment shown in FIG. 2A, FIG. 2B illustrates an embodiment of an encapsulated RFID tag 210 wherein the art image layer is omitted.

Figure 3:
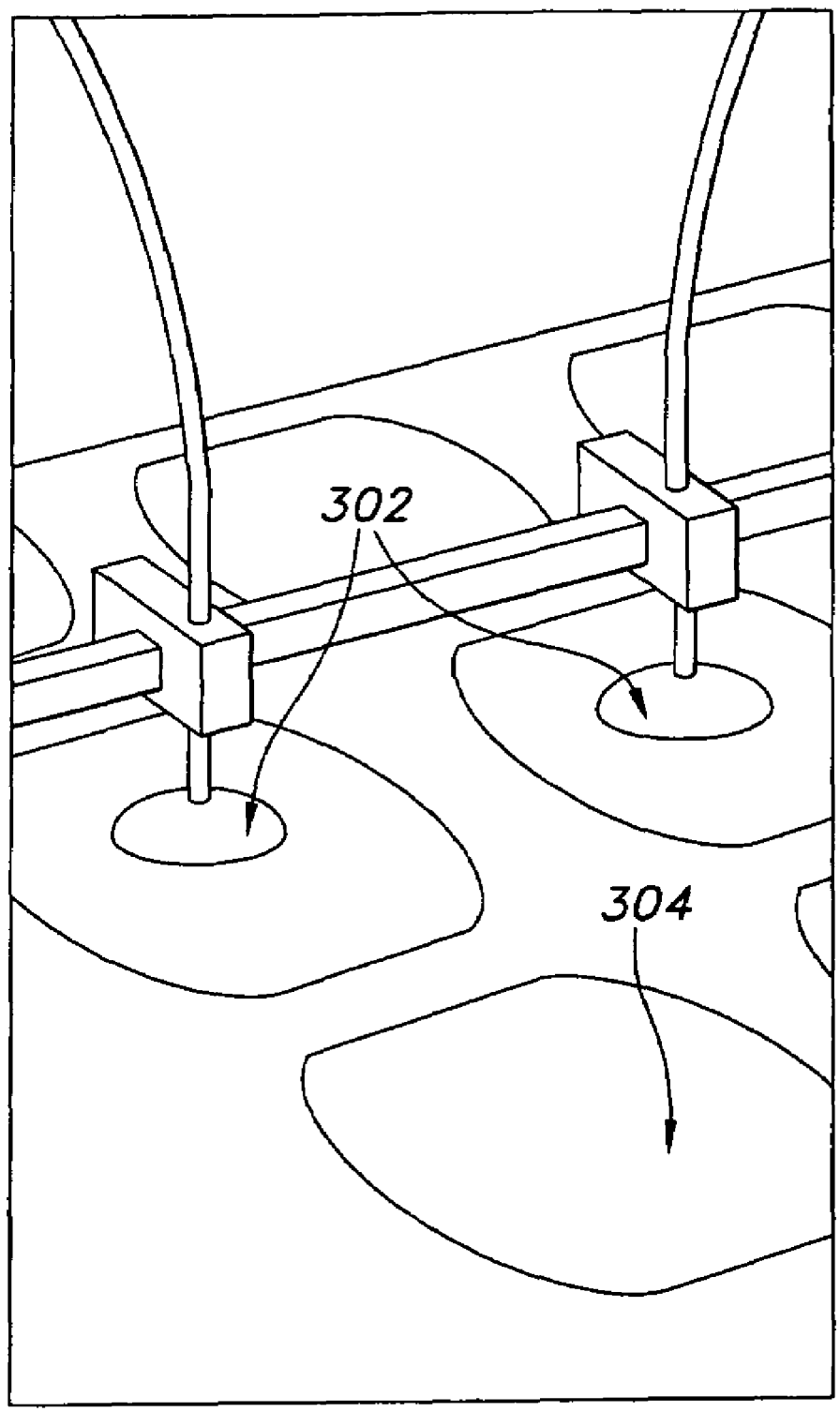
FIG. 3 is an image of the manufacture of an exemplary domed encapsulated RFID tag, wherein the liquid encapsulating material is being placed on the base substrate, RFID device and art image.

FIG. 3 is an image of a manufacturing process for an exemplary domed encapsulated RFID tag, wherein a liquid encapsulating material 302 is placed on a substrate 304 comprised of an RFID device and art image. The encapsulating material 302 may be translucent or opaque, such as a dark or colored substance. The encapsulating material 302 may be comprised of polyurethane, epoxy, acrylics or other suitable resins or materials such as, for example, polyethylene, polypropylene, polystyrene, polyester, etc. Generally, the encapsulating material 302 is comprised of an epoxy for an application where flexibility is not a requirement or polyurethane where more flexibility is needed. The doming process depends on surface tension to form a bubble of the encapsulating material 302 on an item being decorated without going off the edge of the item. The encapsulating material 302 is applied to the substrate 304 and, if required, then exposed to a hardening or curing process, such as exposure to ultra-violet light or heat.

Figure 4:
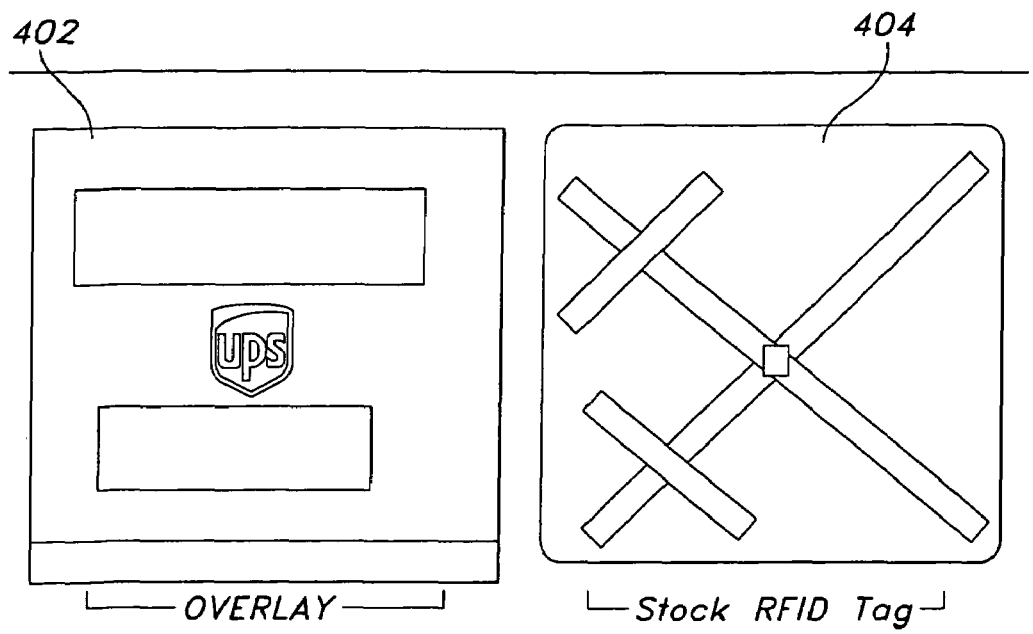
FIG. 4 illustrates an exemplary art image that may overlay an RFID device in an embodiment of the invention.

FIG. 4 illustrates an exemplary art image layer 402 that may overlay an RFID device 404 in an embodiment of the invention. In one embodiment, the art image layer 402 is comprised of an approximately 2.4-mil polyester image substrate, though other thicknesses and materials may be used. The actual image 406 on the art image layer 402 may be silk-screened, painted, drawn, stamped, embedded or otherwise placed on or within the art image layer 402. In other embodiments, the art image layer 402 is comprised of a three-dimensional emblem, novelty, insignia, etc. In embodiments of the invention having an art image layer 402, the encapsulating material is generally translucent so that the art image layer 402 is substantially visible through the encapsulating material.

Figure 5:
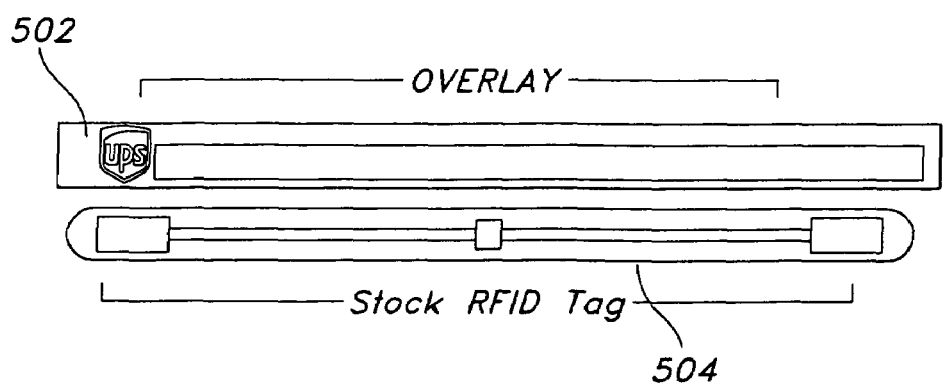
FIG. 5 illustrates another exemplary art image that may overlay another embodiment of an RFID device in an embodiment of the invention.

FIG. 5 is an alternative exemplary art image layer 502 that overlays an alternate RFID device 504 in an embodiment of the invention, as compared to the embodiment shown in FIG. 4.

The RFID device of the various embodiments of the invention may be, for example, an active or passive RFID transponder, as are commonly known in the art. The RFID device may be flexible, rigid, or semi-rigid. The RFID device may be contained within a housing, or it may rely upon the encapsulating material to provide a housing. In one embodiment, the RFID device is a flexible user-programmable RFID transponder such as those that are available from Alien Technologies Corp. of Morgan Hill, Calif.; although other types of RFID devices manufactured by other manufacturers may be used. Other manufacturers of RFID devices include but are not limited to: Matrics, Inc. of Columbia Md.; Phillips Electronics of Eindhoven, The Netherlands; and Texas Instruments Incorporated of Dallas, Tex. In one embodiment, the RFID device is an Alien Technologies Class 1, electronic product code (EPC) transponder.

The RFID device includes devices that comply with the International Organization for Standardization (ISO) 18000-6 standard, including but not limited to ISO 18000-6 types A and B. ISO 18000-6 covers the air interface for RFID tags operating at ultra high frequency (860-930 MHz). The RFID device also includes devices that comply with the other parts of the ISO 18000 standard (e.g., 18000-1, 18000-2, etc.), as such parts are approved and adopted. The ISO 18000-6 standard, and all variants (e.g., Type A and B, etc.), are incorporated in their entirety by reference and made a part hereof. The RFID device also includes devices that comply with Electronic Product Code (EPC) standards, specifications and guidelines as were initially developed by the Auto-ID Center, including but not limited to EPC classes 0-1. The EPC standards are also fully incorporated herein by reference and made a part hereof.

Figures 6A, 6B:
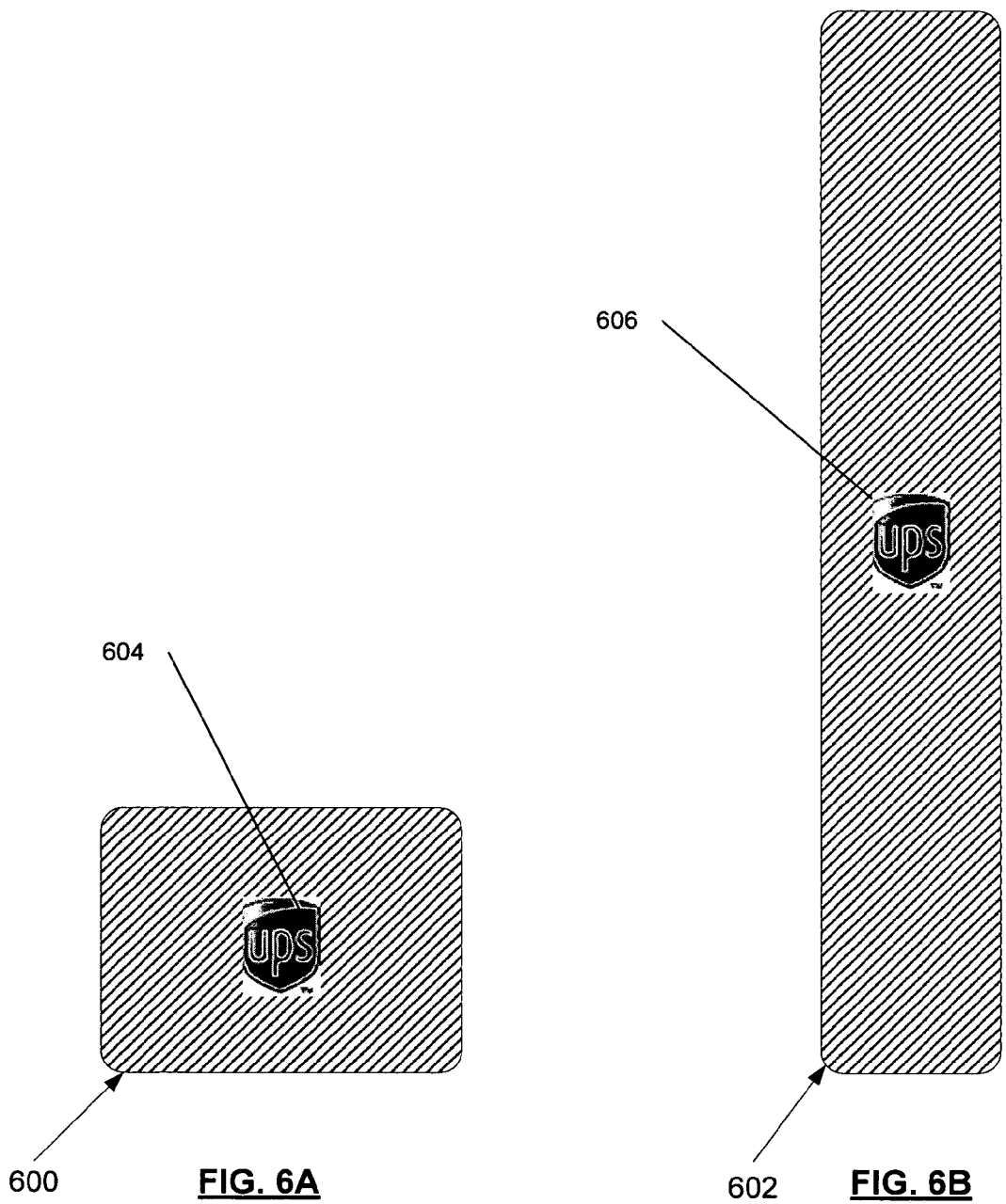
FIG. 6A is a plan view of an exemplary encapsulated RFID tag having an art image, in an embodiment of the invention.
FIG. 6B is a plan view of an exemplary encapsulated RFID tag having an art image, in another embodiment of the invention.

FIG. 6A is a plan, frontal view of an embodiment of an encapsulated RFID tag 600 having an art image 604. FIG. 6B is a plan, frontal view of an alternative embodiment of an encapsulated RFID tag 602 having an art image 606. Other embodiments (not shown) may have omitted the art image or may be in other configurations.

Figure 7:
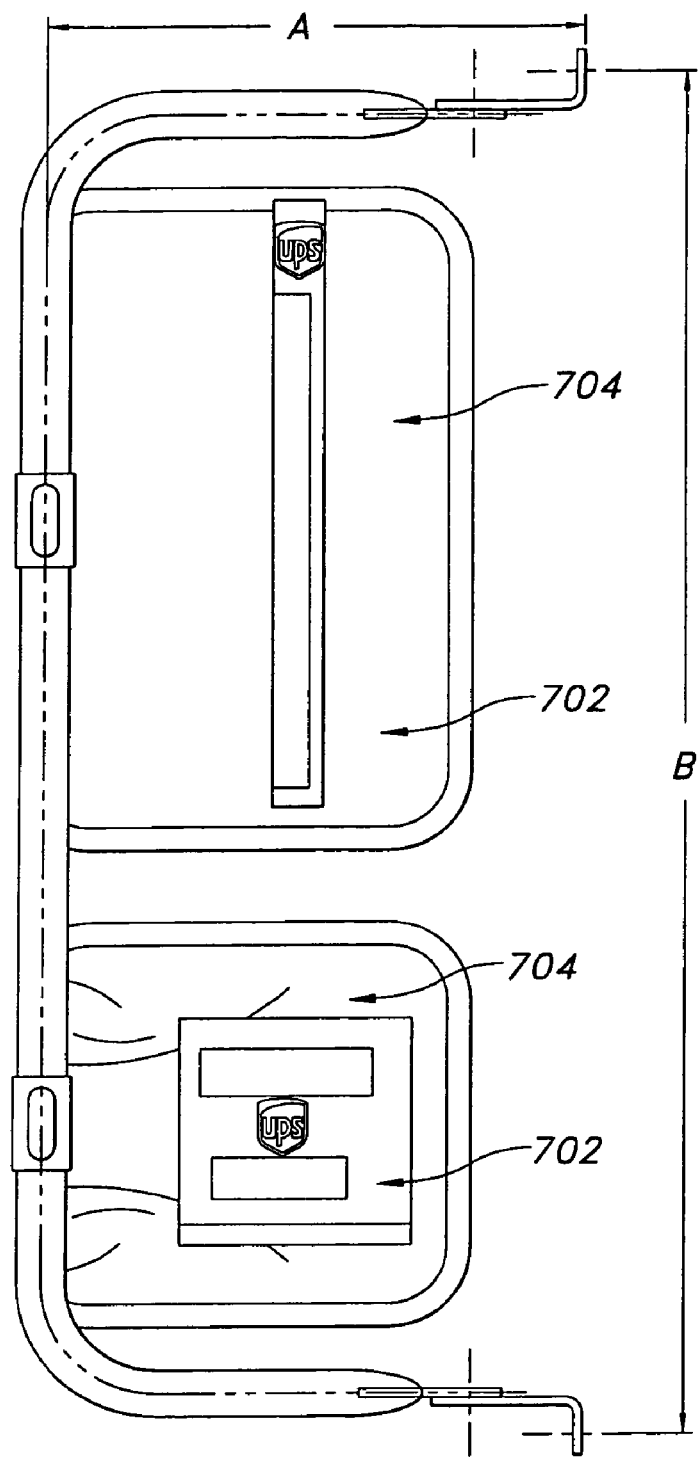
FIG. 7 is an exemplary illustration of two embodiments of an encapsulated RFID tag mounted on mirrors of a vehicle.

FIG. 7 is an exemplary illustration of two embodiments of an encapsulated RFID tag 702 mounted on a mirror 704 of a vehicle. In a typical use of such an encapsulated RFID tag, information about the location of the vehicle, its cargo, ownership, identity, existence, etc. may be programmed into the RFID tag or received by one or more appropriately-placed RFID readers in response to an interrogation signal.

In yet another embodiment (not shown), an RFID device is mounted inside a mirror 704 of a vehicle. Such a mounting will help protect the RFID device from environmental exposure, damage and theft. It will also conceal the RFID device. One method of mounting an RFID device in a vehicle mirror 704 is by removing the neoprene, rubber, or other sealing material that surrounds the mirror from its body or head, placing the RFID device within the body or head such that it will not interfere with the replacement of the mirror or be damaged by moving parts within the head, and replace the mirror and its sealing material. In other mirror types, other methods may be used to place an RFID device within the body of the mirror.

The embodiments of this invention provide encapsulating materials that are comprised of materials such that interference or impediment of RF signals transmitted to or from the encapsulated RFID device is minimized or non-existent. Furthermore, if the encapsulated RFID device is to be placed on or near a ferrous surface, or other material that tends to detrimentally affect RF transmissions, the space between the encapsulated RFID device and the RF resistant materials caused by the encapsulating material tends to improve the transmission and reception properties for the RFID device. In other embodiments, a stand-off bracket is used to further separate the RFID device from RF resistant materials.

Figure 8A:
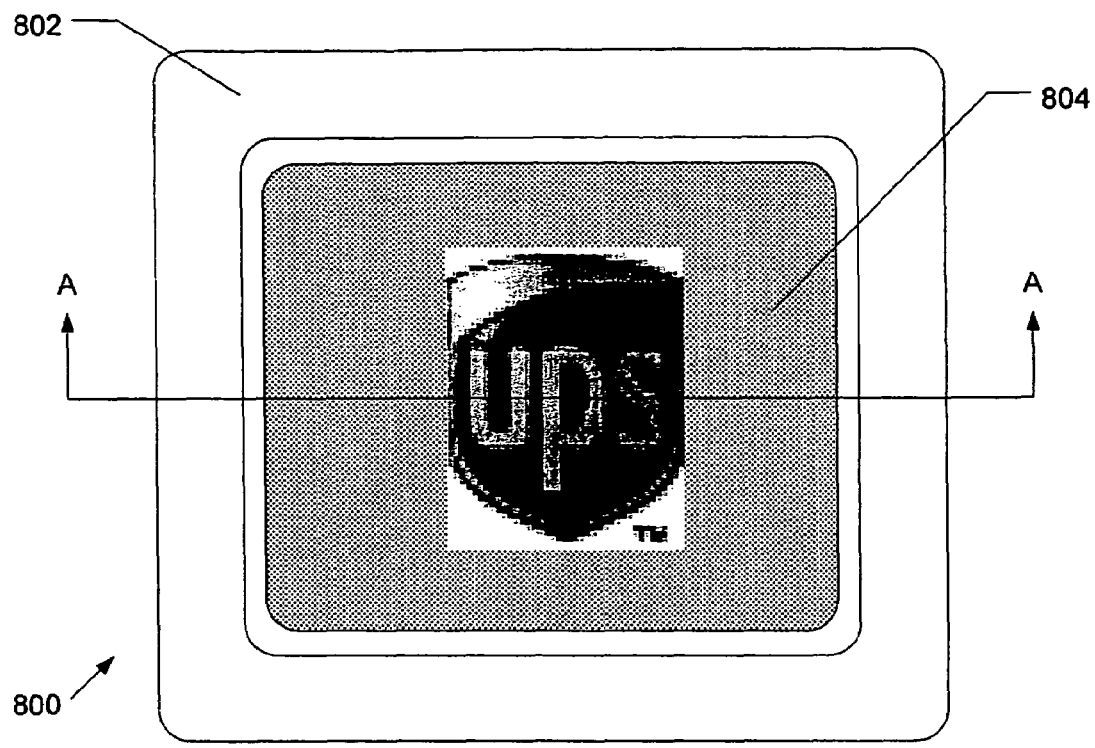
FIG. 8A is a plan view of an embodiment of a stand-off bracket for an RFID device having an exemplary encapsulated RFID device mounted thereon.

FIGS. 8A-8D illustrate embodiments of a stand-off bracket for use with an RFID device. FIG. 8A is a plan view of an embodiment of an RFID device assembly 800 comprised of a stand-off bracket 802 for an RFID device and an exemplary encapsulated RFID device 804 mounted thereon. Section A-A of FIG. 8A is illustrated in FIG. 8C. The bracket 802 is comprised of one or more materials such as, for example, injection molded plastic, paper (e.g., cardboard), corrugated plastic, etc., that have minimal adverse effect on RF signals that travel to and from the RFID device 804. As shown in FIG. 8C, the bracket 802 has a first surface 812 for mounting or setting on a mounting or support surface and a second surface 810 on which the RFID device is attached or placed. The first surface 812 may be glued, nailed, screwed, stapled, clamped or otherwise affixed to the mounting surface, or it may be held in place merely by friction or gravity. The second surface 810 is elevated a distance from the first surface 812 such that the RFID device 804 is held a distance, d, from the mounting surface to which the bracket is attached or placed, as shown in FIG. 8C. Generally, the space 808 between the bottom of the second surface 810 and the mounting surface 812 is hollow, although in other embodiments the space 808 may be filled or partially filled with one or more materials that are RF permeable, or with the same material that comprises the bracket 802. The stand-off bracket 802 allows RF signals to travel in the space between the mounting surface and the RFID device 804, thus enabling better transmission and reception of RF signals by the RFID device 804.

Figure 8B:
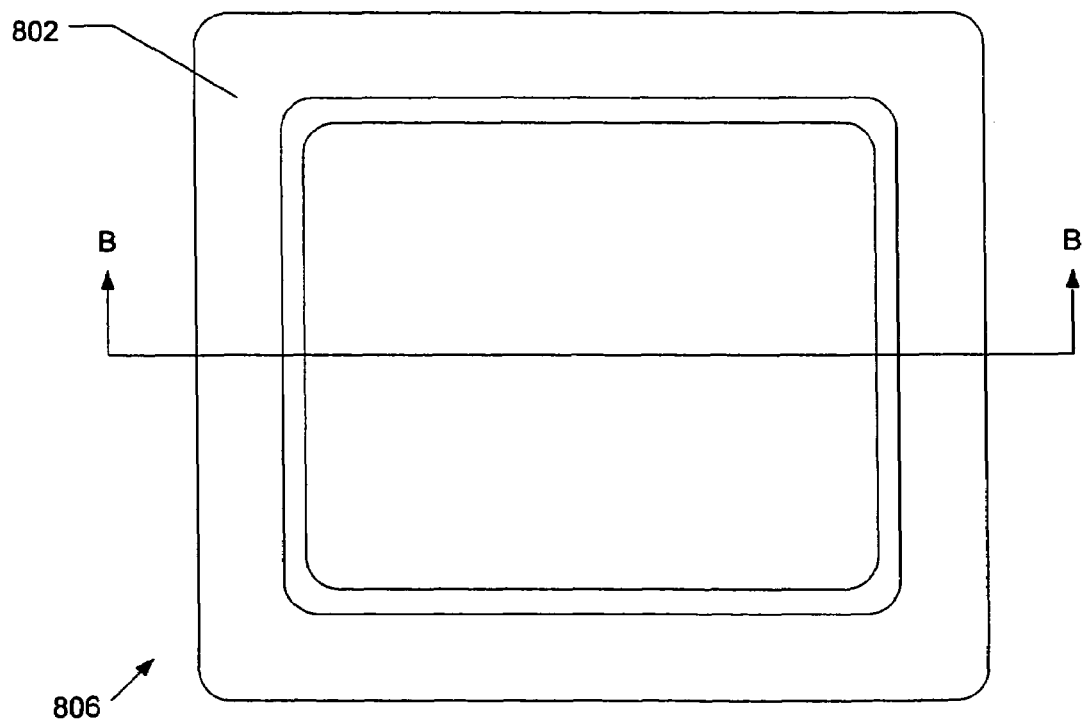
FIG. 8B is a plan view of an embodiment of a stand-off bracket of an RFID device not having an RFID device mounted thereon.

FIG. 8B is a plan view of an embodiment of a stand-off bracket 802. This embodiment is illustrated not having an RFID device mounted thereon. Section B-B of the embodiment of FIG. 8B is illustrated in FIG. 8D.

FIG. 8C is a cross-sectional view of an embodiment of a stand-off bracket assembly 800 having an exemplary encapsulated RFID device 804 mounted thereon. FIG. 8C illustrates Section A-A of FIG. 8A. The RFID device 804 is shown mounted on the upper surface 810 of the stand-off bracket 802, thus providing a distance, d, between the RFID device 804 and any mounting surface. The first surface 812 is for mounting or setting the stand-off bracket 802 on a mounting support surface. FIG. 8D is a cross-sectional view of an embodiment of a stand-off bracket assembly 800 without an RFID device mounted thereon. FIG. 8D illustrates Section B-B of FIG. 8B.

Although the embodiments of the stand-off bracket 802 shown in FIGS. 8A-8D are square, this is for exemplary purposes only. In other embodiments, not shown, the stand-off bracket may be rectangular, circular, oval, triangular, spherical, hemispherical, or any other shape that will provide a separation between the mounted RFID device and the mounting surface.

Figure 9:
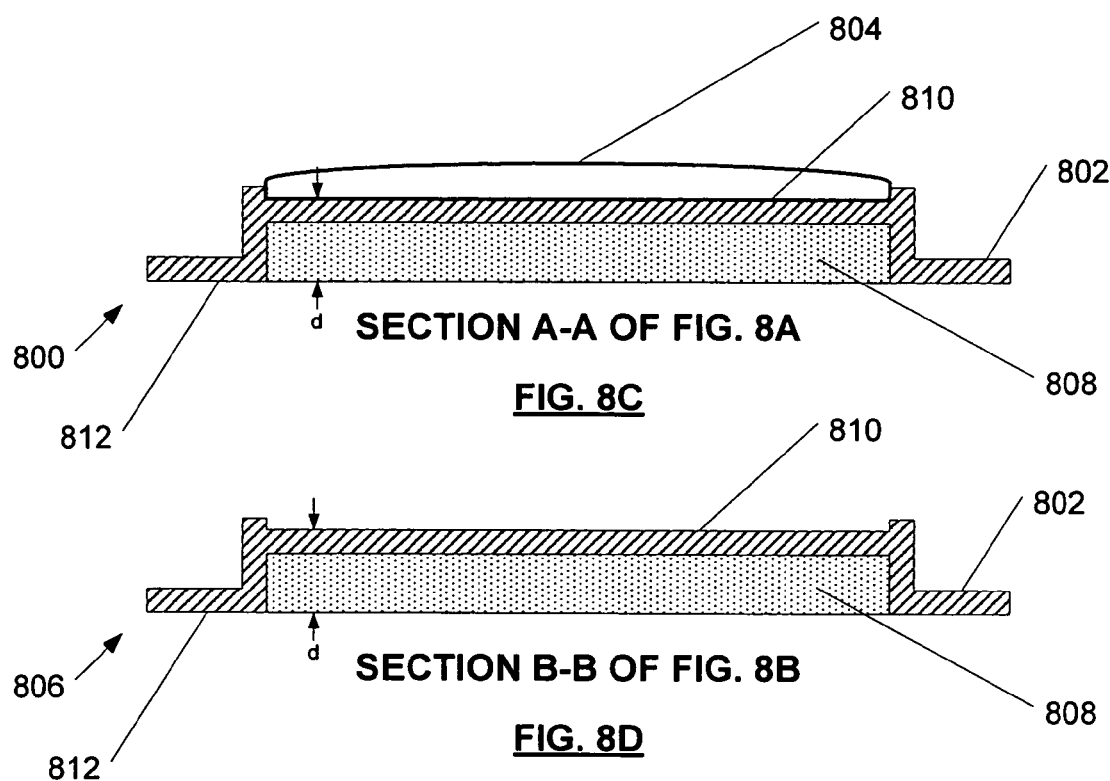
FIG. 9 is a side view of an embodiment of an encapsulated RFID device.
Figure 9:
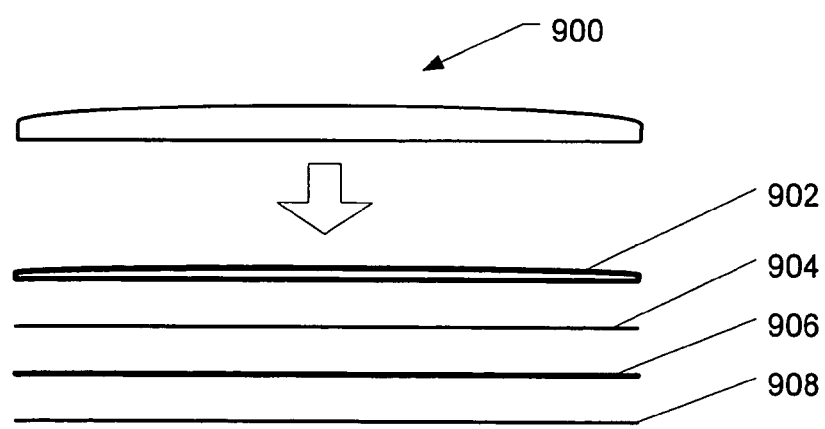

FIG. 9 is a side view of an embodiment of a domed encapsulated RFID tag 900 that may be mounted on a stand-off bracket 802. One particular embodiment of the domed, encapsulated RFID tag 900 utilizes an ISO 18000-6 compliant RFID device, as they are known in the art, though other RFID devices (e.g., EPC compliant) may be used. The RFID tag 900 of the embodiment of FIG. 9 is comprised of four layers, although in other embodiments more or fewer layers may be present. The layers of the RFID tag 900 of FIG. 9 are comprised of an adhesive layer 908, an RFID device 906, an art image layer 904, and an encapsulating material layer 902. These various layers have previously been described herein. The RFID tag 900 may be affixed to the upper surface 810 of a stand-off bracket 802 to provide separation from the RFID tag 900 and the mounting surface for better RF transmission and reception.

Figure 10A:
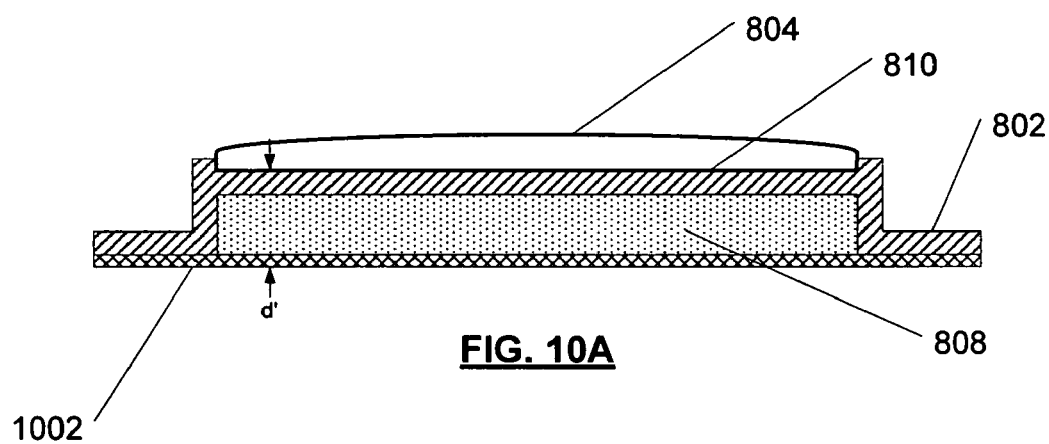
FIG. 10A is a cross-sectional view of an embodiment of a stand-off bracket for an RFID device having an exemplary encapsulated RFID device mounted thereon and having an adhesive layer for mounting.

FIG. 10A is a cross-sectional view of an embodiment of a stand-off bracket 802 for an RFID device having an exemplary encapsulated RFID tag 804 mounted thereon and having an adhesive layer 1002 for mounting. The adhesive layer is affixed to the first surface 812 of the stand-off bracket 802. At least one outer surface of the adhesive layer is comprised of an adhesive material that may be used to adhere the stand-off bracket 802 to a mounting surface. The adhesive layer 1002 also increases the separation between the mounting surface and the top surface 810 of the stand-off bracket 802, where an RFID device may be mounted.

Figure 10B:
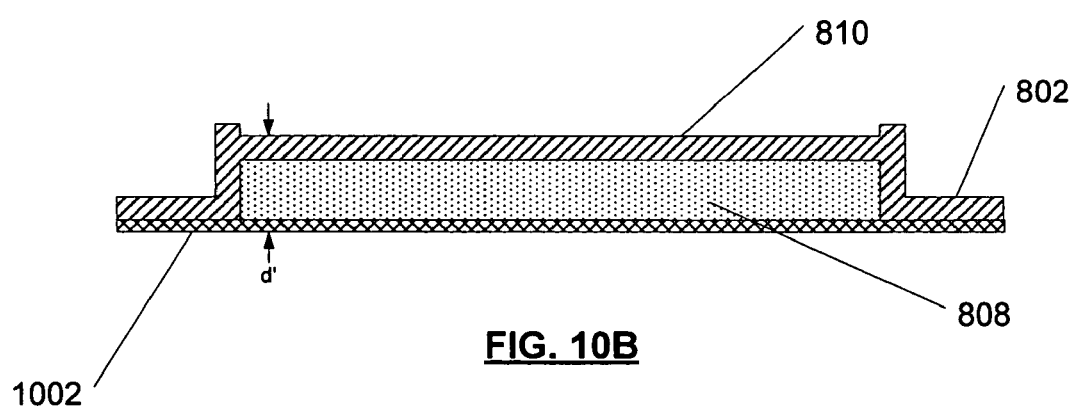
FIG. 10B is a cross-sectional view of an embodiment of a stand-off bracket for an RFID device not having an RFID device mounted thereon but having an adhesive layer for mounting.

FIG. 10B is another cross-sectional view of an embodiment of a stand-off bracket for an RFID device. In this embodiment, an RFID device is not mounted on the stand-off bracket 802; however, the stand-off bracket 802 is further comprised of an adhesive layer 1002 for mounting.

Figure 11:
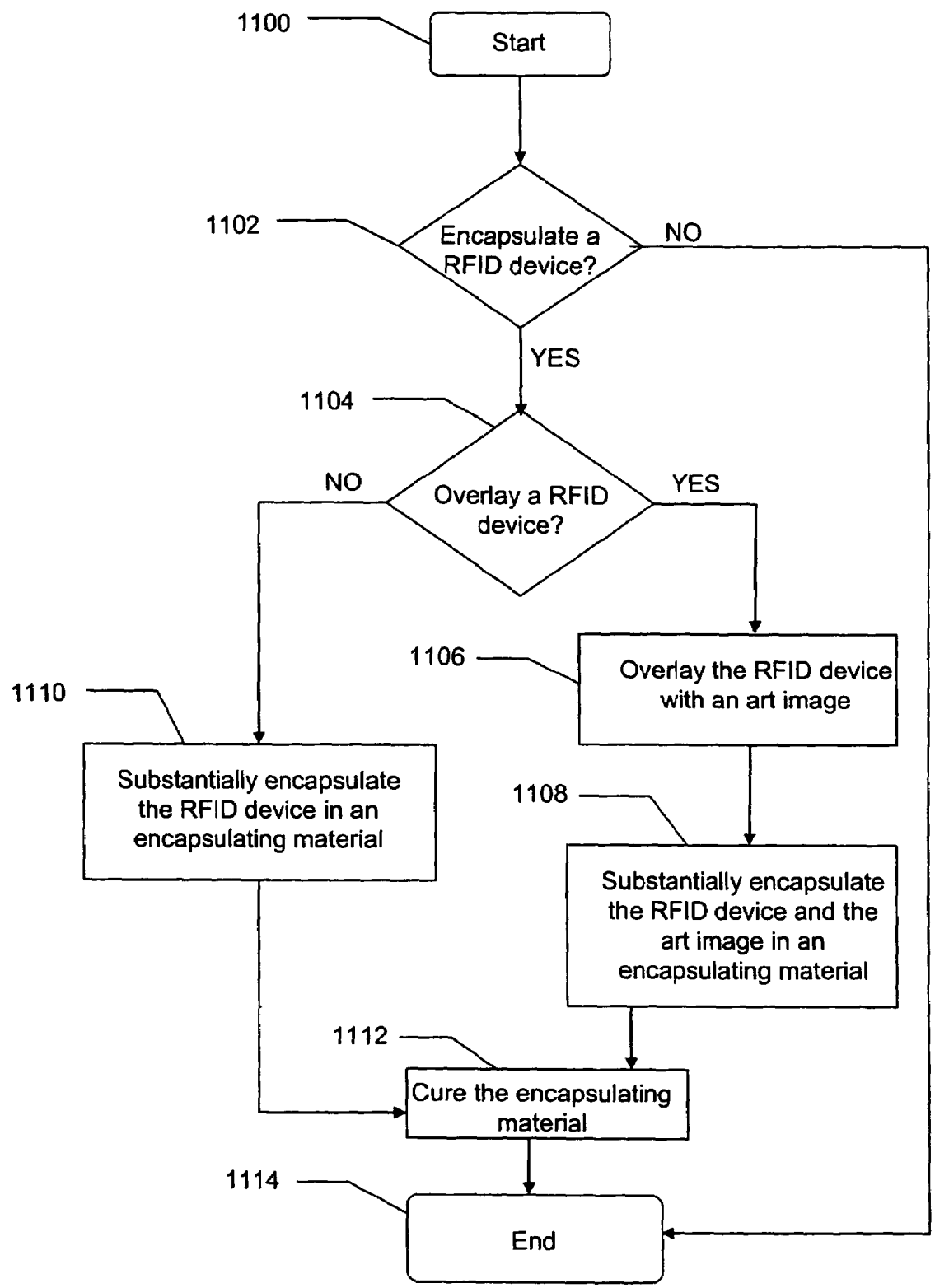
FIG. 11 depicts a flow chart of a method of encapsulating and overlaying an RFID device.

FIG. 11 depicts a flow chart of a method of encapsulating and overlaying an RFID device. The process starts at step 1100. At step 1102 a decision is made whether to encapsulate an RFID device. If at step 1102 the answer is NO, then the process continues to step 1114 where the process ends. If at step 1102 the answer is YES, the process proceeds to step 1104 where a decision is made whether to overlay an RFID device. If at step 1104 the answer is NO, the process continues to step 1110 where the RFID device is substantially encapsulated in an encapsulating material. The encapsulating material is then cured at step 1112. The process continues to step 1114 where it ends. However, if at step 1104 the answer is YES, the process continues to step 1106 where the RFID device is overlaid with an art image layer. The process continues to step 1108 where the RFID and art image are substantially encapsulated in an encapsulating material. The process continues to step 1112 where the encapsulating material is cured. The process continues to step 1114 where it ends.

Figure 12A:
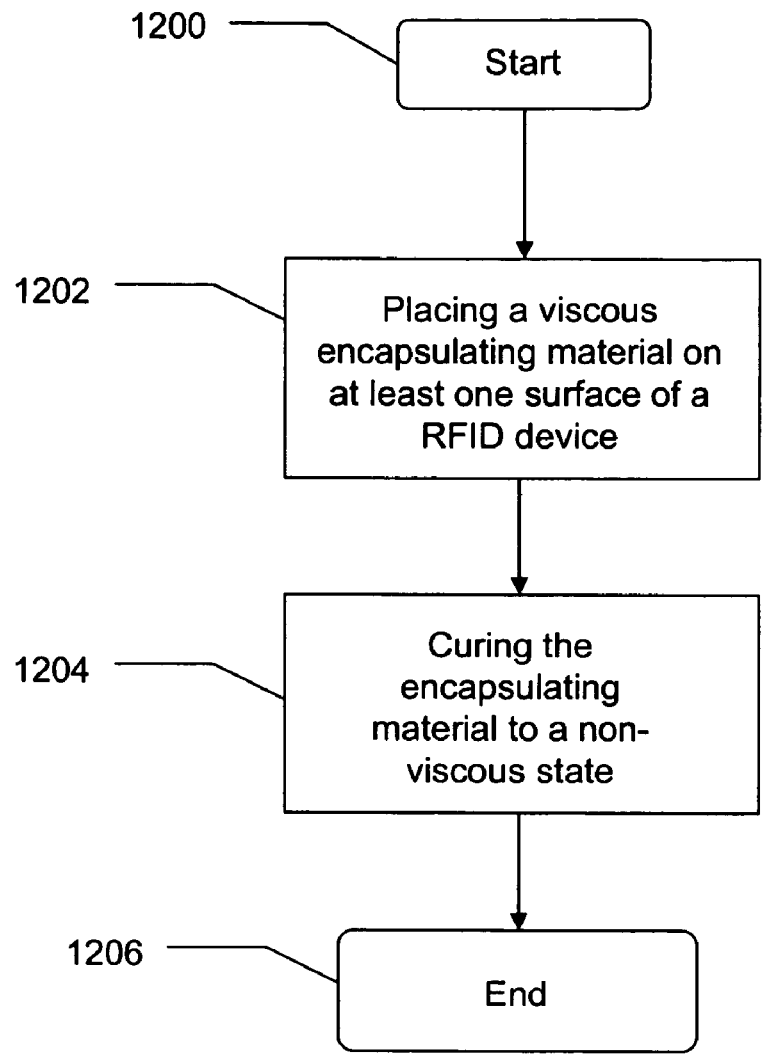
FIG. 12A depicts a flow chart of a method of fabricating an encapsulated RFID tag.

FIG. 12A depicts a flow chart of a method of fabricating an encapsulated RFID tag. The process begins at step 1200. The process continues to step 1202 where a viscous encapsulating material is placed on at least one surface of an RFID device. The process continues to step 1204 where the encapsulating material is cured to a non-viscous state. The process then ends at step 1206.

Figure 12B:
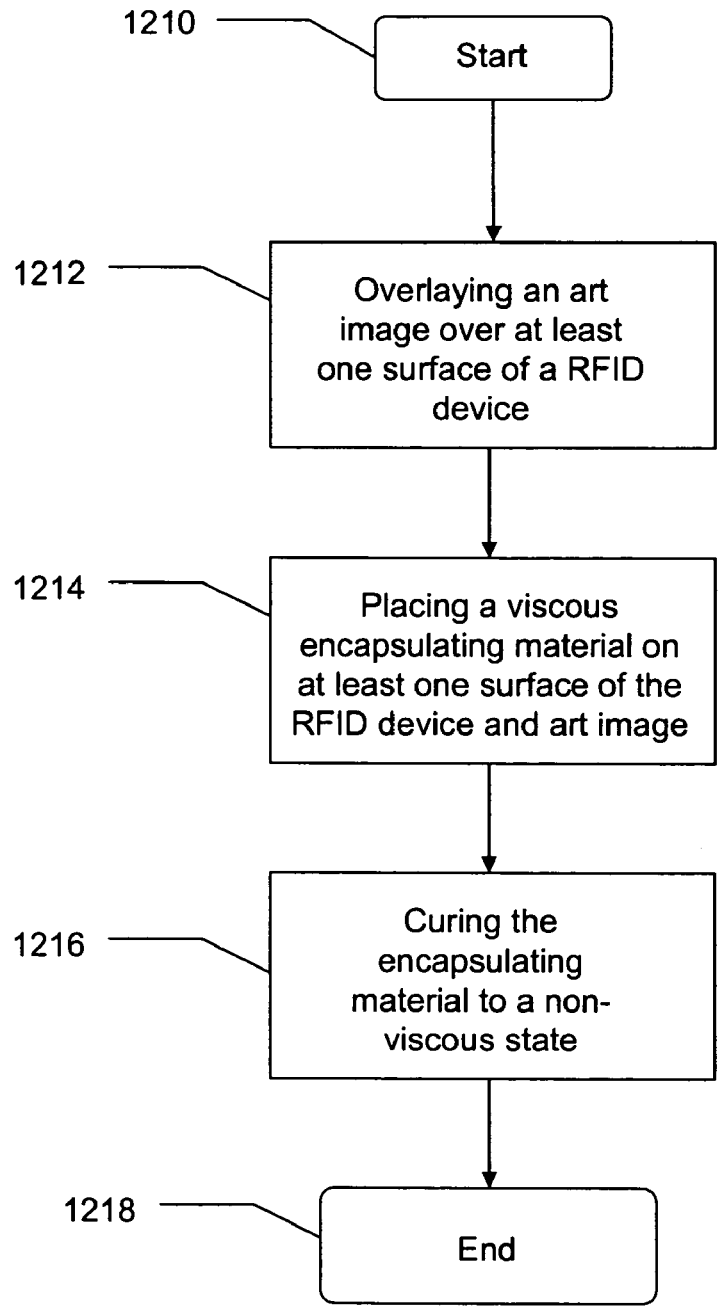
FIG. 12B depicts a flow chart of a method of fabricating an encapsulated RFID tag by overlaying an RFID tag with an art image and encapsulating the RFID device and art image.

FIG. 12B depicts a flow chart of a method of fabricating an encapsulated RFID tag by overlaying an RFID tag with an art image and encapsulating the RFID device and art image. The process beings at step 1210. The process continues to step 1212 where at least one surface of an RFID device is overlaid with an art image. The process continues to step 1214 where a viscous encapsulating material is placed on at least one surface of the RFID device and art image. The encapsulating material is cured to a non-viscous state in step 1216. The process then ends at step 1218.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A domed, encapsulated RFID tag comprising:
    a substrate layer comprising a single continuous layer;
    a RFID device layer comprising a single continuous layer and having a first side affixed to said substrate layer and a second side;
    an art image layer comprising a pre-printed art image and having a first side affixed to said second side of said RFID device layer and a second side; and
    a domed encapsulating material comprising a single continuous layer, said domed encapsulating material affixed to said second side of said art image layer to form a domed, encapsulated RFID tag;
    wherein said substrate layer, RFID device layer, said art image layer, and said domed encapsulating material are unbroken layers.

2. The domed, encapsulated RFID tag of claim 1, wherein the art image layer is comprised of polyester.

3. The domed, encapsulated RFID tag of claim 1, wherein said substrate layer has a first side affixed to said RFID device layer and a second side, and further comprising an adhesive layer affixed to said second side of said substrate layer for adhering the domed, encapsulated RFID tag to a surface.

4. The domed, encapsulated RFID tag of claim 1, wherein the domed encapsulating material is selected from the group consisting of polyurethane, polyethylene, polypropylene, polystyrene, polyester, and epoxy, and combinations thereof.

5. The domed, encapsulated RFID tag of claim 1, wherein the domed encapsulating material is translucent.

6. The domed, encapsulated RFID tag of claim 1, wherein a portion of said domed encapsulating material is opaque.

7. The domed, encapsulated RFID tag of claim 1, wherein said domed, encapsulated RFID tag is mounted on the mirror assembly of a vehicle.

8. The domed, encapsulated RFID tag of claim 1, wherein the domed, encapsulated RFID tag is used for the tracking of items to which the domed, encapsulated RFID tag is attached.

9. The domed, encapsulated RFID tag of claim 1, wherein the domed, encapsulated RFID tag is selected from the group consisting of a label, nametag, luggage tag, advertisement, key fob, emblem, automobile emblem, and decoration.

10. A domed, encapsulated RFID tag comprising:
    an adhesive layer;
    a RFID device layer comprising a single continuous layer and having a first side affixed to said adhesive layer and a second side;
    an art image layer comprising a pre-printed art image and having a first side affixed to said second side of said RFID device layer and a second side; and
    a domed encapsulating material comprising a single continuous layer and affixed to said second side of said art image layer, wherein said adhesive layer, RFID device layer, said art image layer, and said domed encapsulating material are unbroken layers.

11. The domed, encapsulated RFID tag of claim 10, wherein the adhesive layer is comprised of a 2-mil acrylic adhesive layer.

12. The domed, encapsulated RFID tag of claim 10, wherein the RFID device layer is comprised of an RFID transponder.

13. The domed, encapsulated RFID tag of claim 10, wherein the art image layer is comprised of a 2.4-mil polyester image substrate.

14. The domed, encapsulated RFID tag of claim 10, wherein the encapsulating material is translucent.

15. A domed, encapsulated RFID tag comprising:
    an acrylic adhesive layer comprising a single continuous layer and having a first side and a second side;
    a RFID device layer comprised of an RFID transponder comprising a single continuous layer and having a first side affixed to said first side of said adhesive layer, and a second side;

a polyester art image layer comprising a pre-printed art image comprising a single continuous layer and affixed to said second side of said RFID device layer; and an encapsulating material comprising a single continuous layer, wherein said encapsulating material is translucent and affixed to the second side of the acrylic adhesive layer to encapsulate the RFID device layer and the polyester art image layer together to form a domed, encapsulated RFID tag wherein said acrylic adhesive layer, said RFID device layer, said polyester art image layer, and said encapsulating material are unbroken layers.

16. A method of encapsulating a RFID device layer, an art image layer, a substrate layer, and an adhesive layer to form a domed, encapsulated RFID tag, said method comprising the steps of:

substantially encapsulating the RFID device layer, the art image layer comprising a single continuous layer and having a pre-printed art image, the substrate layer comprising a single continuous layer, and the adhesive layer comprising a single continuous layer in a single continuous layer of domed encapsulating material, wherein said RFID device layer has a first side affixed to a second side of said substrate layer and a second side affixed to a first side of said art image layer, said substrate layer has a first side affixed to said adhesive layer, and said art image layer has a second side affixed to said domed encapsulating material, and wherein the substrate layer, RFID device layer, art image layer, and adhesive layer are unbroken layers; and curing said domed encapsulating material to form a domed, encapsulated RFID tag.

17. The method of claim 16, wherein substantially encapsulating the RFID device layer comprises using a domed encapsulating material selected from the group consisting of polyurethane, polyethylene, polypropylene, polystyrene, polyester, an epoxy, and combinations thereof.

18. The method of claim 16, wherein substantially encapsulating the RFID device layer comprises using a translucent domed encapsulating material.

19. The method of claim 16, wherein substantially encapsulating the RFID device layer comprises using an opaque domed encapsulating material.

20. A method of encapsulating and overlaying a RFID device layer to form a domed, encapsulated RFID tag, said method comprising the steps of:

overlaying the RFID device layer with an art image layer, wherein both said RFID device layer comprises a single continuous layer and said art image layer comprises a single continuous layer;

substantially encapsulating the RFID device layer and the art image layer in a single continuous layer of encapsulating material using a domed encapsulation technique; and curing said encapsulating material to form a domed, encapsulated RFID tag;

wherein said RFID device layer, art image layer, and encapsulating material comprise unbroken layers.

21. The method of claim 20, wherein overlaying the RFID device with said art image layer comprises using an art image layer comprised of a 2.4-mil polyester substrate image.

22. The method of claim 20, wherein encapsulating the RFID device layer and art image layer comprises using a translucent domed encapsulating material.

23. The method of claim 20, wherein encapsulating the RFID device layer and art image layer comprises using an opaque domed encapsulating material.

24. A method of fabricating a domed, encapsulated RFID tag comprising:

overlaying an art image comprising a single continuous layer over a first side of a RFID device, said RFID device comprising said first side and a second side, and comprising a single continuous layer;

placing a single continuous layer of a viscous encapsulating material on said second side of the RFID device layer and said art image layer, wherein said viscous encapsulating material, said RFID device layer, and said art image layer are unbroken layers; and curing the encapsulating material to a non-viscous state via a domed encapsulation technique to form a domed, encapsulated RFID tag.

25. A method of fabricating a domed, encapsulated RFID tag comprising:

overlaying an art image comprising a single continuous layer over a first side of a RFID device layer, said RFID device layer comprising a single continuous layer;

placing the RFID device layer and art image layer on a base substrate layer comprising a single continuous layer, wherein a first side of the RFID device is affixed to said base substrate layer and said RFID device layer, art image layer, and base substrate layer are unbroken layers;

placing a single continuous layer of a viscous domed encapsulating material on at least one surface of the RFID device layer and art image layer wherein said domed encapsulating material, said RFID device layer, and said art image layer are unbroken layers; and curing the viscous domed encapsulating material to a non-viscous state via a domed encapsulation technique to form a domed, encapsulated RFID tag.

* * * * *